United States Patent
Alarcon Cot et al.

(10) Patent No.: US 12,057,711 B2
(45) Date of Patent: Aug. 6, 2024

(54) TUNER AND RECTIFIER CIRCUIT FOR WIRELESS POWER RECEIVER

(71) Applicant: NAPTILUS TECHNOLOGY LAB, S.L., Barcelona (ES)

(72) Inventors: Eduardo José Alarcon Cot, Barcelona (ES); Mohamed Abdelhameed, Barcelona (ES); Jordi Aibar Sala, Barcelona (ES); Rafael Terradas Robledo, Barcelona (ES)

(73) Assignee: NAPTILUS TECHNOLOGY LAB, S.L., Barcelona (ES)

( * ) Notice: Subject to any disclaimer, the term of this patent is extended or adjusted under 35 U.S.C. 154(b) by 0 days.

(21) Appl. No.: 16/915,620

(22) Filed: Jun. 29, 2020

(65) Prior Publication Data

US 2020/0328620 A1 Oct. 15, 2020

Related U.S. Application Data

(63) Continuation-in-part of application No. 15/967,142, filed on Apr. 30, 2018, now abandoned.

(30) Foreign Application Priority Data

Feb. 19, 2018 (EP) ..................................... 18000161

(51) Int. Cl.
*H02J 50/12* (2016.01)
*H02J 7/02* (2016.01)

(52) U.S. Cl.
CPC ................ *H02J 50/12* (2016.02); *H02J 7/02* (2013.01)

(58) Field of Classification Search
CPC . H02J 50/12; H02J 7/02; Y02B 70/10; H02M 3/1582
See application file for complete search history.

(56) References Cited

U.S. PATENT DOCUMENTS

| | | | |
|---|---|---|---|
| 6,208,535 B1 * | 3/2001 | Parks | H02M 3/33592 363/26 |
| 6,236,191 B1 * | 5/2001 | Chaffai | H02M 1/34 323/225 |
| 8,093,758 B2 | 1/2012 | Hussmann et al. | |
| 8,183,938 B2 | 5/2012 | Boys et al. | |
| 9,195,251 B2 * | 11/2015 | Mauder | G05F 1/70 |
| 9,236,771 B2 | 1/2016 | Toncich et al. | |
| 10,447,090 B1 * | 10/2019 | Abdolkhani | H02M 7/219 |
| 10,965,156 B2 * | 3/2021 | Peretz | H02M 3/33573 |
| 11,128,172 B2 * | 9/2021 | Ettes | H02J 50/80 |
| 2011/0001461 A1 * | 1/2011 | Lu | H02J 7/0031 323/283 |
| 2012/0039092 A1 * | 2/2012 | Xu | H02M 3/3376 363/17 |

(Continued)

*Primary Examiner* — Daniel Kessie
*Assistant Examiner* — Brian K Baxter
(74) *Attorney, Agent, or Firm* — ArentFox Schiff (57) ABSTRACT

A tuner and rectifier circuit for wireless power transfer receivers is provided using a single inductor and two switching networks. The single inductor is used for energy exchange between the receiver resonant circuit and an output energy buffer network wherein the rectification function is met. The tuning state of the receiver resonant circuit is tracked, and the inductor is accordingly coupled with the receiver resonant circuit after an adaptive time period to inject an inductive reactance to the tank for tuning purpose.

6 Claims, 6 Drawing Sheets

(56) References Cited

U.S. PATENT DOCUMENTS

| | | | |
|---|---|---|---|
| 2015/0255989 A1* | 9/2015 | Walley | H04B 5/0037 |
| | | | 307/104 |
| 2016/0190816 A1* | 6/2016 | Rehm | H02J 50/00 |
| | | | 307/104 |
| 2016/0190914 A1* | 6/2016 | Kim | H02M 1/0085 |
| | | | 363/126 |
| 2017/0025897 A1* | 1/2017 | Menegoli | H04B 5/0037 |
| 2018/0159426 A1* | 6/2018 | Vinciarelli | H02M 3/1582 |
| 2018/0287498 A1* | 10/2018 | Yu | H02M 3/1582 |
| 2018/0366984 A1* | 12/2018 | Joye | H02J 50/12 |
| 2019/0149060 A1* | 5/2019 | Tritschler | H02M 7/217 |
| | | | 307/31 |
| 2019/0173388 A1* | 6/2019 | Suryanarayana | H02M 7/48 |
| 2019/0199205 A1* | 6/2019 | Tao | H02M 7/217 |
| 2019/0348867 A1* | 11/2019 | Rehm | H02J 50/12 |
| 2020/0287458 A1* | 9/2020 | Matsunaga | H02M 7/4837 |
| 2020/0328620 A1* | 10/2020 | Alarcon Cot | H02M 3/1582 |
| 2021/0044150 A1* | 2/2021 | Tang | H02J 50/402 |

\* cited by examiner

TUNER AND RECTIFIER CIRCUIT FOR WIRELESS POWER RECEIVER

CROSS REFERENCE TO RELATED APPLICATION

This application claims priority to and is a continuation-in-part application of U.S. application Ser. No. 15/967,142 filed Apr. 30, 2018, claiming priority to European Patent Application No. 1800161.2 filed Feb. 19, 2018 and entitled "TUNER AND RECTIFIER APPARATUS FOR WIRELESS POWER TRANSFER RECEIVER" which hereby incorporated by reference in their entireties.

FIELD OF THE INVENTION

The present invention relates to wireless power transfer and wireless power transfer receivers and, more specifically, to a tuner and bridgeless rectifier in a compact circuit structure.

TECHNICAL BACKGROUND AND RELATED ART

Magnetic resonance wireless power transfer (WPT) has become a reliable technology for contactless power delivery for a wide range of applications. The WPT spans a wide field of applications ranging from few milliwatts low-power sensors up to tens of kilowatts high-power electric vehicles. In WPT systems, a transmitting coil is energized by an alternating current producing a magnetic flux that is linked to one or more other receiving coils that are attached to either a stationary or moving load. In order to enhance the efficiency of WPT links while extending the power delivery distance, resonating coils are created at the transmitter and receiver sides by compensating the coils using capacitive elements connected either in series or parallel with the corresponding coils. The transmitter and receiver resonant circuits must be tuned to the same frequency of operation in order to ensure a maximum power transmission at the highest possible efficiency.

A common problem in magnetic WPT systems is the stability and sensitivity issues when the transmitting and receiving resonant circuits are designed for high quality factor (Q) operation. It has been shown that the higher the quality factor, the higher the maximum power that could be delivered to the load. On the other hand, a high Q WPT receiver implicates high selective resonant characteristics that makes the resonant tank vulnerable to any small mismatch. The mismatch causes include, but are not limited to, frequency drifts, circuit parameter variations due to components tolerance or environmental effects, metallic or radiating proximity devices, and misalignment between coils. Any source of mismatch would deteriorate the performance of high Q WPT receivers and the power transfer capability is greatly degraded. To enable the employment of high Q resonant WPT receivers, the receivers has to be equipped by a device for compensating the potential effects of mismatch.

Solutions for this problem include adding a variable reactive element to the WPT receiver tank that could be used for tuning. This approach has been described in U.S. Pat. No. 8,093,758, where an inductor has been added to the receiver to tune or detune the resonant circuit dynamically according to the load conditions. However, this approach has been applied for the purpose of decreasing the losses of the receiver power converter at light loads. Moreover, a rectifying bridge is required.

Another approach in U.S. Pat. No. 8,183,938 disclosed a variable reactance realized in one embodiment by a saturable core inductor where the inductance value is controlled by varying a bias current to control the output power level. However, the disclosed system is used to track the tuning condition of the system while a separated power circuit is required for rectification and regulation of the output power.

Another approach posed in U.S. Pat. No. 9,236,771 where a plurality of variable capacitors is coupled or decoupled from the resonant tank through a plurality of switches in order to alter the resonance frequency of the resonant tank. However, this approach requires a large number of capacitors and switches still with limited tuning capabilities.

U.S patent application 2016190816 discloses a wireless power receiver comprising a receiver resonant circuit formed by three reactive components for receiving wireless power; one single switch electrically arranged between two same type series coupled reactive components in said receiver resonant circuit for switching it between a first mode and a second mode responsive to a first control signal, wherein the first mode corresponds to a parallel resonant circuit and the second mode corresponds to a series resonant circuit, wherein the one single switch operates as a series resonant circuit rectifier for rectifying an AC voltage generated by received wireless power in said second mode; one full wave parallel resonant circuit rectifier for rectifying an AC voltage or half AC voltage generated from the received wireless power across the two same type series coupled reactive components and said one single switch in said first mode; and one second switch for coupling the full wave rectified parallel resonant circuit voltage to one load in said first mode and for decoupling the full wave rectified parallel resonant circuit voltage from said one load in said second mode.

SUMMARY OF THE INVENTION

This invention is meant to enable the employment of high Q resonant WPT receivers while an automatic tuning for the resonant circuit is achieved with one inductor coupled between two switching networks whereas the rectification from alternating current to charge an output buffer is achieved using the same circuit. A compact circuit structure is configured to: sense the tuning condition of the WPT receiver tank and adaptively generate a first interval of time synchronized with respect to the positive and negative cycles; couple the inductor with the resonant circuit to charge the inductor from the resonant voltage during a second interval of time; and couple the inductor between the resonant tank and the output energy buffer in order to rectify the energy from the resonant tank to the output buffer during a third interval of time.

The invention also comprises a switch controlling circuit that senses one or more parameters from the receiver resonant circuit and respond by generating a first interval of time accordingly; wait for the said first interval of time and then switch one or more switches of the first switching network to couple the inductor across the receiver resonant circuit during a second interval of time; and switch one or more switches of the second switching network to couple the inductor between the receiver resonant circuit and the output buffer during a third interval of time.

In another aspect, the invention discloses one of the preferred embodiments, wherein the receiver resonant circuit is coupled between a first node and a second node. An inductor coupled between a third node and a fourth node. A first switching network, comprises: a first switch coupled between the first node and the third node; and a second switch coupled between the fourth node and the second node. A second switching network comprises: a first switch coupled between the fourth node and a fifth node; and a second switch coupled between the third node and the fifth node. An energy buffer network comprises at least one energy buffer element coupled between the fifth node and the second node. A switch controlling circuit configured to sense the voltage or current or both of the receiver resonant circuit and respond by closing one switch or more of the first and second switching network after a first interval of time synchronized with their respective cycles of the receiver resonant voltage.

This aspect includes waiting for elapsing of the first interval of time generated by the switch controlling circuit during the positive half-cycle of the resonant voltage, then the inductor is coupled between the first and the second node by closing the first and the second switches of the first switching network during a fixed or variable second interval of time. In the said second interval of time, the inductor charges from the receiver resonant voltage. Then, the second switch of the first switching network is opened, and the first switch of the second switching network is closed to couple the inductor between the third and the fourth node during a fixed or variable third interval of time. In the said third interval of time, the output energy buffer is energized from the receiver resonant circuit and the inductor. This sequence is repeated during the negative half-cycle of the resonant voltage, where the first and second switches of the first switching network are closed to charge the inductor with a negative current, and then the first switch of the first switching network is opened and second switch of the second switching network is closed to energize the output energy buffer from the inductor during a third interval of time.

In a further aspect of the invention, another embodiment of the invention is a receiver resonant circuit coupled between a first node and second node. An inductor coupled between a first node and a third node. A first switching network, comprises: a switch coupled between the third node and the second node. A second switching network comprises: a first switch coupled between the third node and fourth node; and a second switch coupled between the third node and fifth node. An energy buffer network comprises: a first energy buffer coupled between the fourth node and the second node; and a second energy buffer coupled between the second node and the fifth node. A switch controlling circuit configured to sense the voltage or current or both of the receiver resonant circuit and respond by closing one switch or more of the first and second switching network after a first interval of time synchronized with their respective cycles of the receiver resonant voltage.

This aspect includes waiting for elapsing of the first interval of time generated by the switch controlling circuit during the positive half-cycle of the resonant voltage, then the inductor is coupled between the first and the second node by closing the switch of the first switching network during a fixed or variable second interval of time. In the said second interval of time, the inductor charges from the receiver resonant voltage. Then, the switch of the first switching network is opened, and the first switch of the second switching network is closed to couple the inductor between the third and the fourth node during a fixed or variable third interval of time. In the said third interval of time, the first energy buffer is energized from the receiver resonant circuit and the inductor. This sequence is repeated during the negative half-cycle of the resonant voltage, where the switch of the first switching network is closed to charge the inductor with a negative current, and then the switch of the first switching network is opened and second switch of the second switching network is closed to energize the second energy buffer from the receiver resonant voltage and the inductor during a third interval of time.

The invention may also broadly consist in any new parts, elements and features referred to herein, individually, or collectively, in any or all combinations of said parts, elements or features.

DESCRIPTION OF EMBODIMENTS

Figure 1:
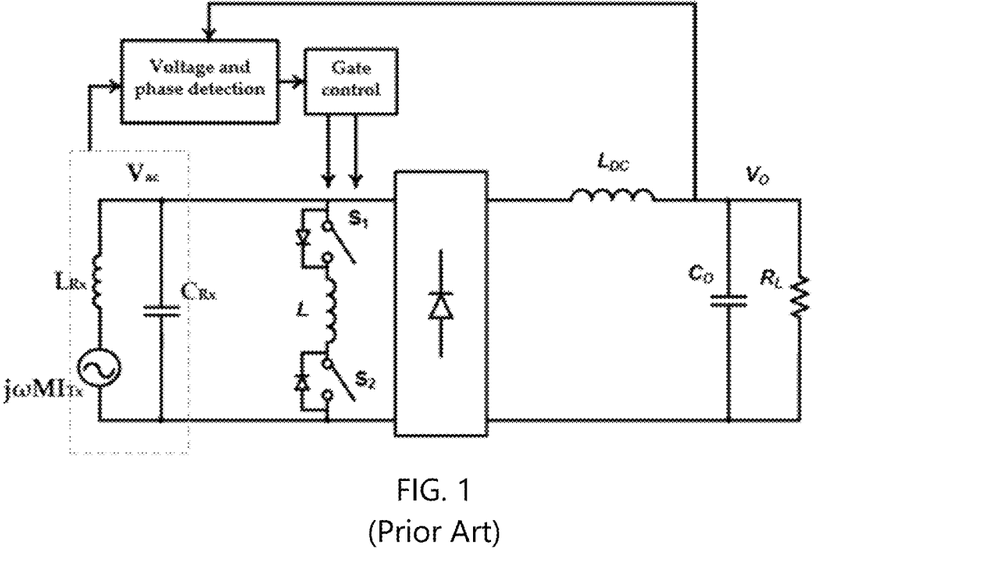
FIG. 1 shows a schematic diagram for one known embodiment of power flow control in WPT receivers.
Figure 2:
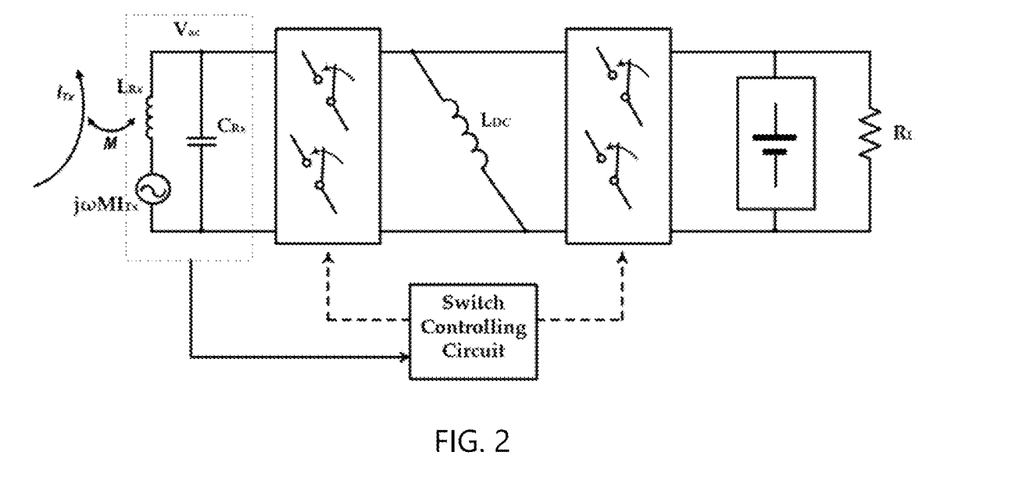
FIG. 2 is a block diagram showing a WPT receiver connected to the tuner and rectifier device of the disclosure.

Referring to the drawings, the preferred embodiments of the invention are described in detail. FIG. 2 shows the block diagram of a WPT receiver coupled to a tuner and rectifier device which may be considered as a general embodiment for invention. In general, the WPT receiver comprises: a WPT receiver resonant tank coupled between a first node and a second node; a inductor $L_{DC}$ coupled between a third node and a fourth node; an energy buffer network coupled between a fifth node and a sixth node; a first switching network having two ports and the first port is coupled between the first and the second nodes, while the second port is coupled between the third and the fourth nodes; a second switching network having two ports and the first port is coupled between the third and the fourth nodes, while the second port is coupled between the fifth and the sixth nodes; and a switch controlling circuit that senses one or more parameters of the WPT receiver resonant tank and respond by controlling the switches of the first or the second switching networks.

The first switching network or the first switching network in FIG. 2 may contain one or more switches. The inductor $L_{DC}$ having two terminals coupled between the first switching networks and the second switching networks, wherein the inductor $L_{DC}$ may be coupled in to the terminals of the receiver resonant circuit or coupled to the terminals of the energy buffer network or coupled between the receiver resonant circuit and the energy buffer network.

In operation, the switch controlling circuit in FIG. 2 may sense one or more parameters of the receiver resonant circuit to track the tuning condition of the receiver resonant circuit. The controller, in response to the tuning condition of the receiver resonant tank, may respond by closing one or more switches of the first switching network or the second switching network or both of them. Consequently, the inductor $L_{DC}$ may be coupled to the receiver resonant tank or between the receiver resonant tank and the energy buffer network. While the inductor $L_{DC}$ is coupled to the receiver resonant tank, the inductor charges either with a positive current or a negative current according to the polarity of the receiver resonant tank voltage.

The switch controlling circuit tracks the tuning condition of the receiver resonant circuit and respond by applying an adaptive time-delay that is synchronized with the start of either a positive cycle or negative cycle of the receiver resonant voltage. Then, after the elapsing of the time-delay, the switches of the first switching network or the second switching network are enabled to either couple the inductor to the receiver resonant tank or the energy buffer network. The adaptive time-delay applied by the switch controlling circuit allow the synthesis of a variable reactance to be coupled in parallel with the WPT receiver tank. Consequently, the disclosed structure allows adaptive tuning of the receiver resonant circuit as well as energy rectification using a single inductor $L_{DC}$.

Figure 3:
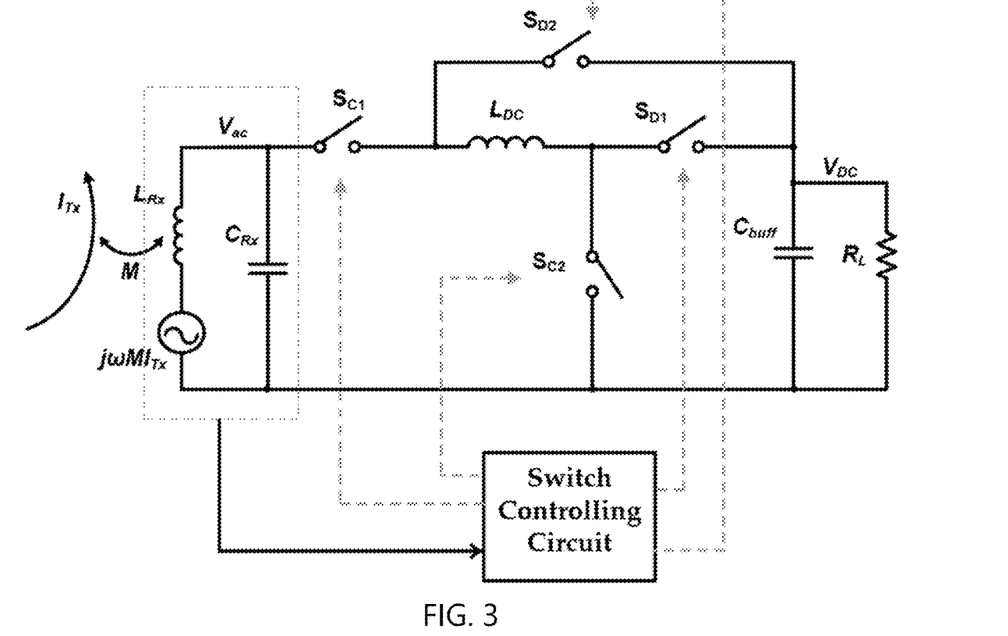
FIG. 3 is a schematic diagram of one embodiment showing of the disclosed tuner and rectifier device.

FIG. 3 shows one embodiment of the invention including an apparatus for tuning and rectification and a WPT receiver. The topology of the WPT receiver comprises a receiving coil $L_{Rx}$ compensated by one capacitor $C_{Rx}$ in parallel, therefrom a parallel resonant tank is constituted. The tuning and rectification apparatus is connected in parallel with the receiver resonant tank.

In FIG. 3, the tuning and rectification apparatus comprises a single inductor $L_{DC}$, and four switches ($S_{C1}$, $S_{C2}$, $S_{D1}$, and $S_{D2}$) and an output capacitor $C_{out}$ representing an energy buffer. The switches are used to control the charging and discharging of the inductor $L_{DC}$ by connecting the inductor $L_{DC}$ either to the receiver resonant circuit or to the energy buffer $C_{out}$ or between both of them. Referring to the same figure, the apparatus includes a switch controlling circuit that senses one or more circuit parameters from the receiver resonant tank and produces the drive gating signals of the four switches.

In operation, the switch controlling circuit tracks the tuning condition of the receiver resonant tank, according to the sensed parameters, and then start the switching sequence after the elapsing of a first interval of time. Then, switches $S_{C1}$ and $S_{C2}$ are engaged for a second interval of time by enabling their drive gating signals, thereof, the inductor $L_{DC}$ is coupled in parallel with the receiver resonant. During the said second interval of time, the inductor charges with a current either going out or going in the receiver resonant circuit according to a positive half-cycle or negative half-cycle of the receiver resonant tank voltage. The second interval of time may be a controlled time or uncontrolled. After that, during a third interval of time, switch SC2 is opened and switch SD1 is closed to direct the energy to the energy buffer Cout. During the said third interval of time, the inductor is coupled between the receiver resonant tank and the energy buffer Cout, wherein the third interval of time may be controlled (or uncontrolled).

The implementation of switches (SC1, SC2, SD1, and SD2) may be realized by any semiconductor technology such as MOSFETs, IGBTs, or any other semiconductor technology that ensures a fast switching performance while the losses are kept low such that an optimum performance is guaranteed.

Figure 4:
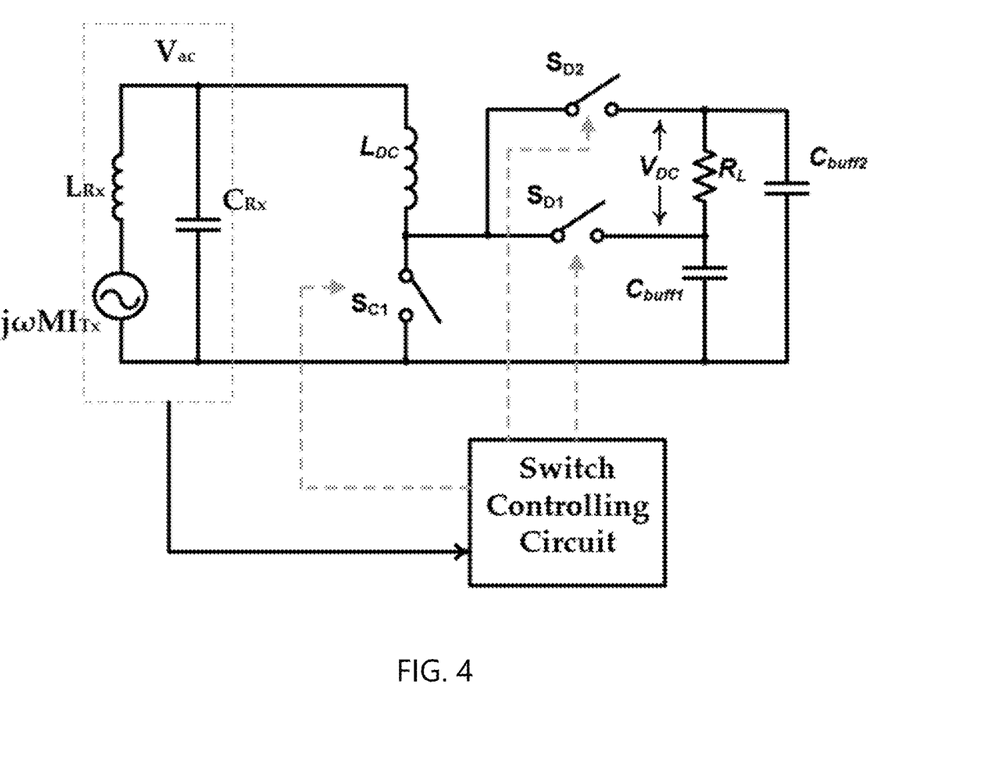
FIG. 4 is a schematic diagram showing another embodiment of a tuner and rectifier device.

FIG. 4 shows a tuner and rectifier apparatus according to another embodiment of the invention including a WPT receiver comprises a receiving coil $L_{Rx}$ compensated by one capacitor $C_{Rx}$ in parallel, therefrom a parallel resonant tank is constituted. The tuning and rectification apparatus comprises a single inductor $L_{DC}$, and four switches ($S_{C1}$, $S_{D1}$, and $S_{D2}$) and two output capacitors $C_{buff1}$ and $C_{buff2}$ representing the energy buffer network. The switch $S_{C1}$ controls the charging of the inductor $L_{DC}$ from the receiver resonant tank while switches $S_{C1}$ and $S_{D2}$ controls the de-energization of inductor $L_{DC}$ whereas the energy is rectified to one of the output capacitors. A switch controlling circuit that senses one or more circuit parameters from the receiver resonant tank and respond by selectively switch $S_{C1}$, $S_{D1}$, and $S_{D2}$ accordingly through the drive gating signals.

The switch controlling circuit in FIG. 4 tracks the tuning condition of the receiver resonant tank by sensing one or more parameters including a voltage or current or both of them. In order to adjust the reactive part synthesized by the circuit, the switch controlling circuit respond by generating a first interval of time in order to delay the engagement of the inductor $L_{DC}$ to the receiver resonant circuit. It has been found that delaying the current passing out of the receiver resonant tank with respect to the receiver tank voltage synthesizes an inductive reactance loading to the receiver resonant tank. The synthesized inductive reactance is a function of the time-delay after which the inductor $L_{DC}$ is engaged to the receiver resonant tank. In general, the switch controlling circuit adaptively track the tuning condition of the receiver resonant tank and respond by either increasing or decreasing the time-delay in order to synthesize a variable inductive reactance to retune the receiver tank.

In a positive half-cycle of the receiver resonant voltage, the switch controlling circuit delay the switching for the first interval of time, then engage the inductor LDC to the receiver tank by closing switch SC1 to charge the inductor during a second interval of time. At the end of the second interval of time which may be controlled (or uncontrolled), switch SC1 is opened and switch SD1 is closed for a third interval of time, wherein the inductor LDC is coupled between the receiver resonant tank and the first output capacitor Cbuff1 in order to rectify the energy to the output.

The same switching sequence is followed during the negative half-cycle of the receiver resonant voltage, after the elapsing of the first interval of time, the inductor LDC is engaged to the receiver resonant tank during a second interval of time. The third interval of time starts by opening switch SC1 and close switch SD2 to couple the inductor LDC between the receiver resonant tank and the second output capacitor $C_{buff2}$ to the rectify a second portion of the receiver tank energy. The final rectified output voltage may be the summation of the voltage of $C_{buff1}$ and $C_{buff2}$ wherein the load may be coupled between the two capacitors.

Figure 5:
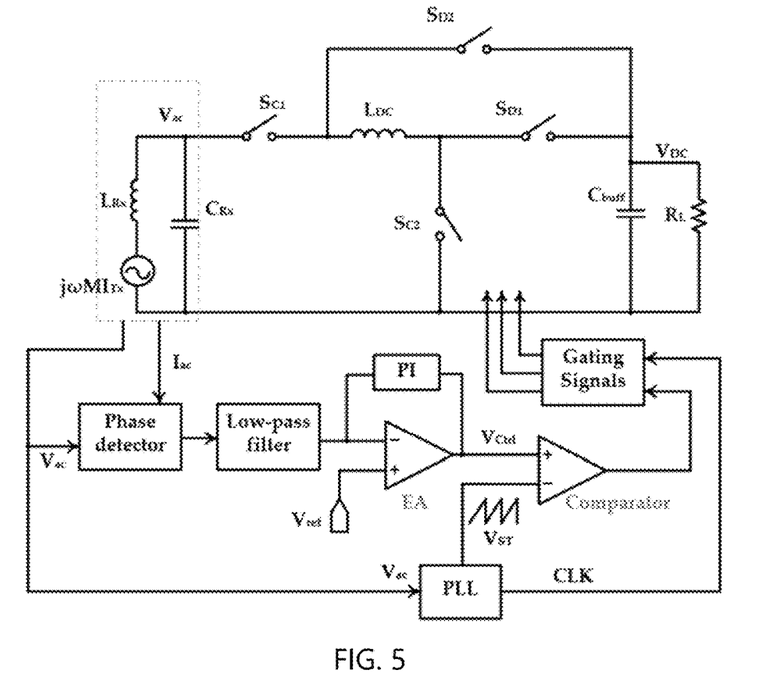
FIG. 5 shows a block diagram of the control of one of the preferred embodiments.

FIG. 5 illustrates the tuner and rectifier apparatus in the embodiment of FIG. 3 wherein the switch controlling circuit may be replaced by an embodiment shown in the figure. A possible MOSEFT based realization for switches $S_{C1}$, $S_{C2}$, $S_{D1}$ and $S_{D2}$ is also indicated in the schematic diagram. The switches realization shown in the figure may be considered as an exemplary embodiment, thereof the switches may be realized with a different technology without departing from the scope of the invention. The switch controlling circuit, in FIG. 5, comprises a phase detector, low-pass filter, error amplifier (EA), phase locked loop (PLL), comparator and gating block. The control approach is designed based on sensing the receiver resonant tank voltage $v_{ac}$ and the resonant current $i_{ac}$, wherein the control loop ensures that $v_{ac}$ lags the resonant current $i_{ac}$ by 90°, thereof the receiver tank fully-tuned condition is reached. The output of the phase detector that represents the phase difference between $v_{ac}$ and $i_{ac}$ may be compared to a fixed reference voltage $V_{ref}$ that corresponds to a phase lag of 90°. Then, the dc level coming from the error amplifier is compared with a sawtooth to produce the value of the time-delay a.

Figure 6:
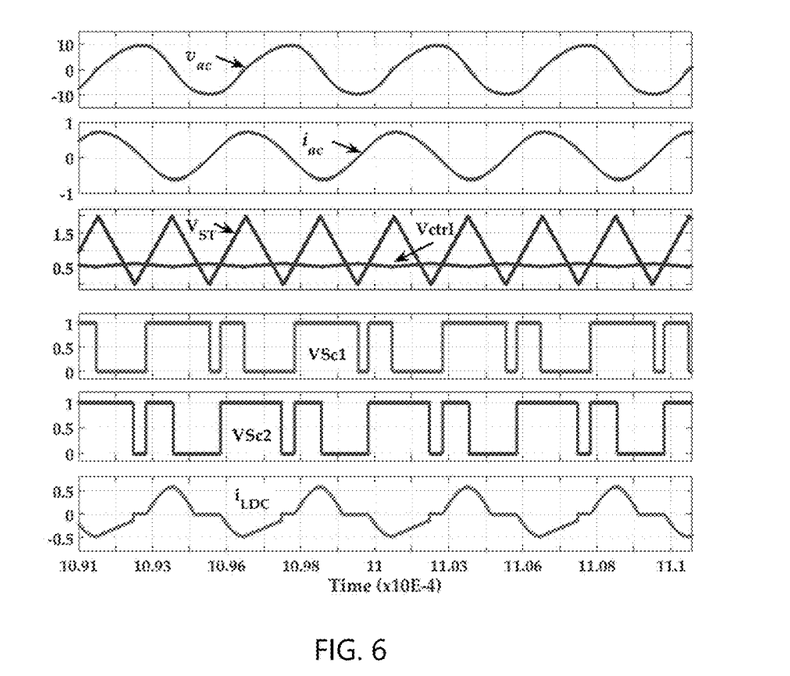
FIG. 6 shows the resonant tank voltage and the corresponding current in the inductor of the embodiment in FIG. 3 while showing the direct current voltage of the output buffer.
Figure 7:
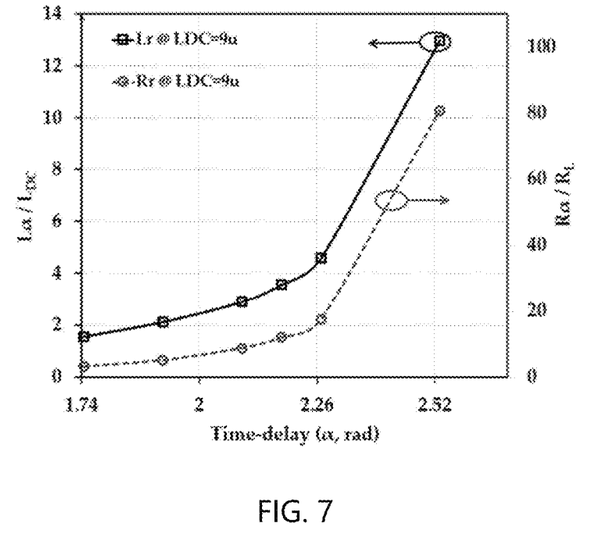
FIG. 7 shows a graph of the equivalent variable inductance versus the time-delay and the equivalent ac resistance versus the same time-delay.

The full system including the invention embodiment and the exemplary control shown in FIG. 5 is simulated to illustrate the operation. The simulation waveforms in FIG. 6 shows the receiver resonant tank voltage $v_{ac}$, the receiver resonant current $i_{ac}$, the control output signal $V_{Ctrl}$, the sawtooth signal $V_{ST}$, the gating signals of $S_{C1}$ and $S_{C2}$, and the inductor current $i_{LDC}$. According the aforementioned operation, the control output signal $V_{Ctrl}$ is compared with the sawtooth signal $V_{ST}$ to result in the correct delay-time value α corresponding a specific synthesizable inductance $L_\alpha$. The said synthesizable inductance $L_\alpha$ is necessary for ensuring that the receiver resonant tank is fully-tuned. FIG. 7 shows the ration between the equivalent synthesizable inductance $L_\alpha$ and the inductance $L_{DC}$ ($L_\alpha/L_{DC}$) versus the time-delay a in radian. It is clear that the equivalent synthesizable inductance $L_\alpha$ increases monotonically as the time-delay increases over a wide range extends between 2× to more than 12× of the actual inductance used $L_{DC}$. Moreover, the same figure shows the plot of the ratio between equivalent ac resistance $R_\alpha$ and the output load resistance $R_L$ versus time-delay a in radian. It is shown that $R_\alpha$ also is a function of the time-delay a wherein the effect could be seen as a variation in the output power of the WPT receiver circuit, however if the first time portion for charging the inductor $L_{DC}$ is controlled, the value of $R_\alpha$ could be adapted accordingly toward a constant value that corresponds to a constant output power.

Figure 8:
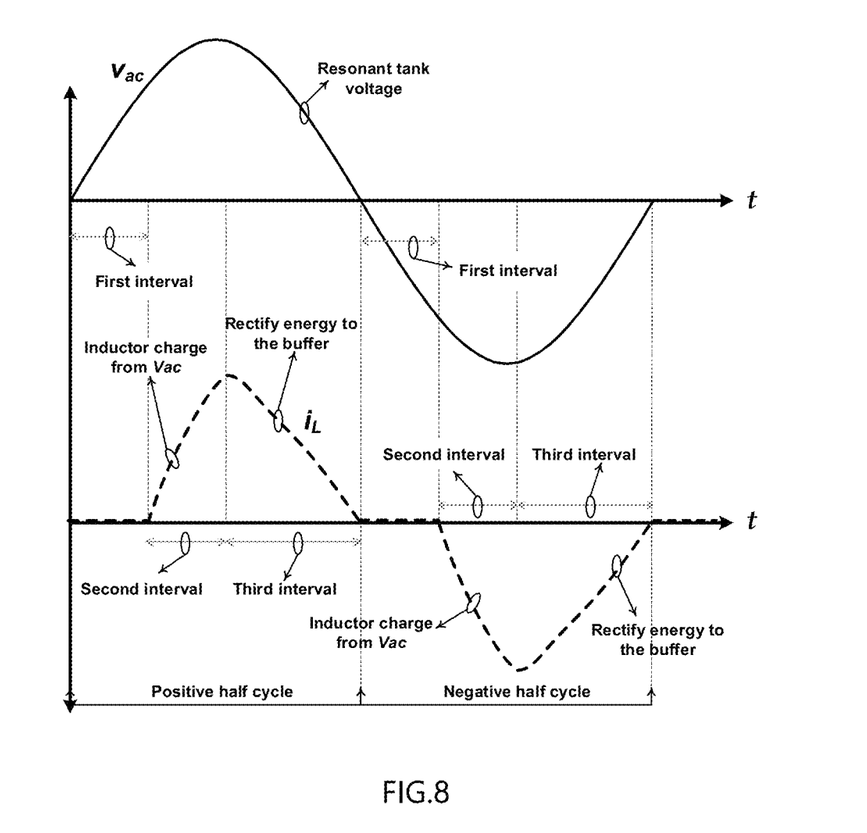
FIG. 8 is graph showing the timing of current path in the inductor in accordance to the different switching phases.

The modes of operation are illustrated in FIG. 8, where Vac is the resonant tank voltage applied to the rectifier and tuner circuit while iL is the inductor current. According to the disclosed operation, the switching sequence during a positive-half cycle of Vac starts by the first interval wherein the current in the inductor is zero as the inductor is decoupled from the resonant tank voltage. Depending on multiple preferred embodiments, the inductor is decoupled from Vac by opening one switch or more from the first switching network, such that there is no electrical path between Vac and LDC. Once the first interval is elapsed, the second interval initiates during which the inductor is coupled in parallel to the receiver resonant tank and allowed to charge from Vac and reaches a positive current peak by the end of the second interval. Following, the third interval of operation commences during wherein the inductor is coupled between the receiver resonant tank and the energy buffer. During the third interval, the inductor current decreases due to the fact the stored energy in the inductor is rectified to the energy buffer. Depending on the load resistance, the resonant tank voltage Vac, the operating frequency, the inductor value LDC, and the duration of the third interval itself, the stored energy in the inductor may be fully depleted and iL comes to zero by the end of the third interval. In other cases where the third interval may come to an end while still some residual energy exists in the inductor, inductor current ringing may occur. Obvious to one skilled in the art, an auxiliary current path would be added to fully deplete the residual energy in the inductor such that it could be steered in the energy buffer. Similarly, the same switching sequence is supervened during the negative half-cycle. The durations of the first interval, second interval, and third interval are the same among in both cases of positive and negative half-cycles. Given the fact that the wireless power receiver circuit is based on bridgeless rectification, the inductor current goes in the negative direction during the negative half-cycle as shown in FIG. 3. Due to the symmetry of the time intervals between positive and negative half-cycles, the inductor current reaches the same peak value yet in different sign. By adjusting the first interval, the equivalent input reactance for such circuit is adjusted such that the said variable input reactance in conjunction with the receiver resonant tank elements is controlled to tune the natural frequency of the resonant tank towards the operating frequency of the wireless power link.

Figure 9:
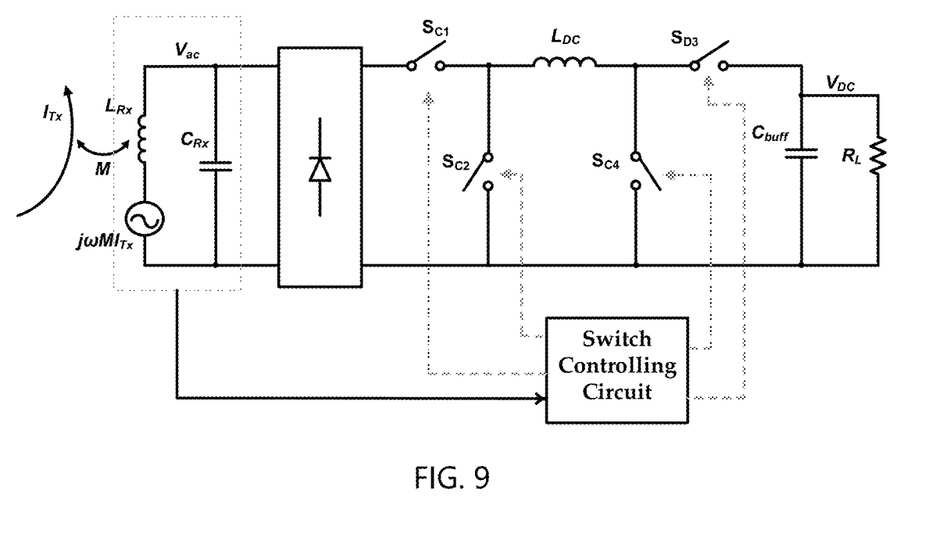
FIG. 9 is a schematic diagram of another embodiment of a wireless power receiver circuit.

Another exemplary embodiment of the present invention is related to the automatic tuning and regulation as shown in FIG. 9. In this embodiment, the receiver resonant voltage Vac is rectified by means of a passive or active bridge and converted to a full-wave rectified voltage. The operation of the circuit shown is similar to those of FIG. 3 and FIG. 4 in terms of the switching sequence. Therefore, the operation constitutes three different intervals that are conformed every half cycle of Vac, namely the first interval, the second interval and the third interval. Still the first interval is the duration at which the circuit is decoupled from the rectifier output, i.e. no current flows out of the rectifier during the said interval. If the first interval is adjusted such that the equivalent input reactance is adjusted accordingly, the emerging variable reactance can be used to tune the receiver resonant tank. On the other hand, the second and third intervals are adjusted such that the energy supplied to the buffer is regulated. Those of ordinary skill in the art may recognize the circuit of FIG. 9 as a four-switch buck-boost. However, the circuit is operated in such a way to adopt the switching method indicated in FIG. 8. The first interval is initiated at the commence of every half-cycle of Vac, during this time switches SC2 and SC3 are closed. As stated earlier, it is clear that no current flows out of the rectifier during the first interval as switch SC1 is open. The closure of SC2 and SC3 ensures that any residual energy stored in the inductor is fully depleted in the energy buffer. Then, the second interval starts immediately after the elapsing of the first interval by closing switches SC1 and SC4 and opening switches SC2 and SC3, thus the inductor is coupled across the rectifier output and the inductor current iL increases gradually until it reaches a peak by the end of the second interval. Once the second interval is elapsed, the third interval is engaged by opening switch SC4 and closing switch SC3 such that the inductor becomes coupled between the rectifier output and the energy buffer. During the third interval, the energy stored in the inductor is directed to the energy buffer and the inductor current iL decreases. It becomes obvious that the second interval and third interval together constitutes the energy processing between the rectifier and the energy buffer. Thus, the output energy can be regulated by adjusting either the second interval or the third interval. Those of ordinary skill in the art will use PWM control to regulate the output energy by controlling either the second interval or the third interval.

What is claimed is:
1. A wireless power receiver circuit interfacing a receiver resonant tank magnetically coupled to a transmitter, and for directing electrical energy to an energy buffer, comprising:
 (a) an inductor configured to process electrical energy;
 (b) a first switching network configured to exchange energy between the receiver resonant tank and the inductor, and a second switching network configured to exchange energy between the inductor and the energy buffer, wherein both, the first switching network and the second switching network, are configured to:
cut electrical current through the inductor during a first interval of time of a voltage output from the receiver resonant tank;
direct electrical current from the receiver resonant tank to the inductor during a second interval of time of the voltage output from the receiver resonant tank; and
direct electrical current from the inductor to the energy buffer during a third interval of time of the voltage output from the receiver resonant tank; and
(c) a switch controlling circuit configured to control the first switching network and the second switching network;

the wireless power receiver circuit being configured such that the switch controlling circuit is operably configured to adjust the first interval of time to adjust an equivalent input reactance of the wireless power receiver circuit and adjust the second interval of time and the third interval of time to adjust active energy of the wireless power receiver circuit, thereby operably performing active tuning for a resonant frequency of the receiver resonant tank and adjusting the active energy directed to the energy buffer concurrently.

2. The wireless power receiver circuit in claim 1, wherein the switch controlling circuit is configured to: close one or more switches of the first switching network during the second interval of time of the voltage output from the receiver resonant tank to electrically couple the inductor in parallel with the receiver resonant tank, allowing the inductor to charge; and maintain one or more switches of the first switching network closed and close one or more switches from the second switching network during the second interval of time of the voltage output from the receiver resonant tank to couple the inductor between the receiver resonant tank and the energy buffer, allowing the energy to be rectified to the said energy buffer.

3. The wireless power receiver circuit of claim 1, wherein the first interval of time is configured such that:
the first interval of time is engaged equally during positive cycle and negative cycle of the voltage output from the receiver resonant tank; and
the first interval of time counts from the starting of the positive half-cycle or negative half-cycle of a voltage from the receiver resonant tank.

4. The wireless power receiver circuit of claim 1, wherein the first interval of time is adaptively adjusted such that the equivalent input reactance of the circuit is adjusted to tune the resonant frequency of the receiver resonant tank to control a tuning condition relative to an operating frequency of the wireless power system.

5. The wireless power receiver circuit of claim 1, wherein the switch controlling circuit comprises a phase detect device, by means of the phase detect device the switch controlling circuit is configured to:
sense a voltage and a current of the receiver resonant circuit and generate a phase difference signal;
detect whether the phase difference signal reaches a predetermined value such that a tuning condition of the receiver resonant tank is detected; and
adaptively generate the first interval of time of the charging cycle during which no current flows out of the receiver resonant tank, thereby the equivalent input reactance of the circuit is adjusted to tune the resonant frequency of the receiver resonant tank towards a full tuning condition.

6. The wireless power receiver circuit of claim 1, wherein the second interval of time and the third interval of time of the charging cycle are configured to rectify the energy from the receiver resonant tank to the energy buffer.

* * * * *